INVENTOR
ALVIN L. JOHNSON

ATTORNEY 3,260,498
EXPANSIBLE PLUG LEAKPROOF VALVE
Alvin L. Johnson, 70 Piedmont St., Worcester, Mass.
Filed Nov. 30, 1962, Ser. No. 241,190
1 Claim. (Cl. 251—189)

This invention relates to a new and improved leakproof valve embodying a novel principle in preventing leakage particularly through the bushings, handle, etc., of the valve when the valve is open or closed or in any intermediate position. To this end the construction embodies a valve housing having a flow passage through it and a transverse guideway in the form of a chamber extending across the flow passage, said guideway containing a deformable, resilient pre-expanded plug or the like, the valve including means for moving this plug between flow passage open condition to flow passage closed condition, together with means for applying extra pressure on said plug and tightly squeezing it into extremely close sealing association with respect to the side walls of the guideway chamber so that no particular gaskets, etc., are necessary, but at the same time the valve is completely sealed whether it is open or closed against any kind of leakage.

Other objects and advantages of the invention will appear hereinafter.

Reference is to be had to the accompanying drawings, in which

Figure 1:
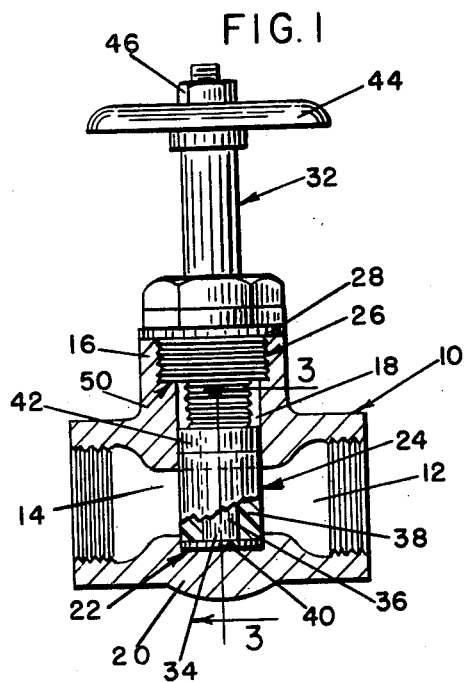
FIG. 1 is a view in section illustrating the invention and showing the valve closed.

In carrying out the present invention there is shown generally indicated by reference numeral 10 a valve housing which has a flow through passage indicated at 12 and 14 to which pipes or hoses can be applied in the usual manner. The valve housing has an upstanding boss 16 thereon the same containing an open ended chamber 18 which extends completely through the flow passage and finds an indented or depressed flat seat 22 having the same section as the guideway 18 in the bottom wall 20. The guideway 18 is larger in diameter than the diameter of the flow passage as indicated at 24.

The boss 16 is internally threaded as at 26 to receive a fitting 28 internally threaded as at 30 to receive a threaded valve actuator member generally indicated at 32.

The valve actuator member 32 is elongated and hollow and contains within it a rotary stem 34. This rotary stem extends out through the bottom of the threaded portion of the valve actuator member 32 as indicated at 36 and it is surrounded at this point by a deformable rubber or plastic plug 38 which has the same cross sectional shape as that of the guideway 18. This shape is preferably cylindrical but can be any shape desired.

The end of the rod 36 terminates in fixed relation with respect to a lower supporting abutment member 40 and at the opposite end of the plug there is an upper abutment member 42. The plug 38, abutment 40, and abutment 42, all form a unit which is moved up and down between the FIG. 1 position and the FIG. 2 position when the hand wheel 44 is rotated, the hand wheel being fixed with respect to the valve actuating member 32.

However the rod 34 is rotatable independently i.e., relatively with respect to valve actuator 32 and is held in position by any desired means such as a nut 46 having a washer or the like 48 contacting the hub of the handle 44. Since rod 34 is fixed to abutment 40, the nut 46 when turned against washer 48, tends to expand or release plug 38, and this is done to expand the plug to slidingly seal it in its guideway 18.

Figure 2:
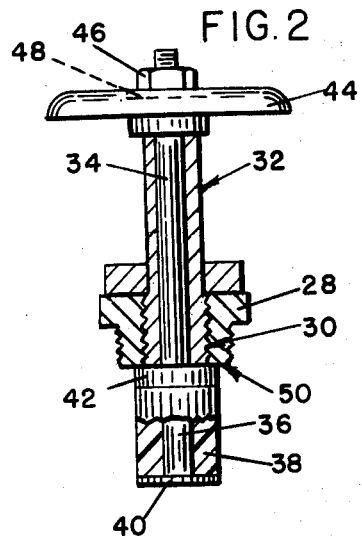
FIG. 2 shows the valve unit with the housing omitted, the valve being in open position.
Figure 3:
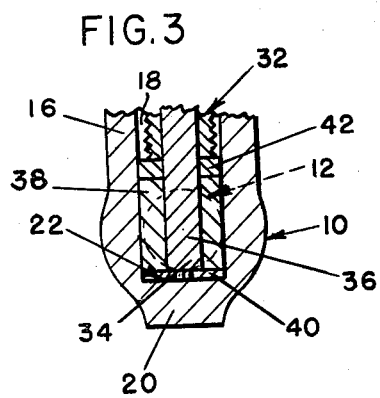
FIG. 3 is an enlarged view on line 3—3 of FIG. 1.

In the operation of the device assuming the valve to be in closed position as shown in FIG. 1, rotation of handle 44 in the appropriate direction raises the valve actuator 32 and therefore of course with it the plug 38 and associated parts 36, 40 and 42. When the upper abutment member 42 reaches the bottom edge 50 of the fitting 28, it is of course stopped and continued motion of hand wheel 44 moves valve actuator 32 slightly upwardly and taking with it the rod 34 and abutment 40, provides a relatively powerful vertical compression action on plug 38.

This action causes the plug at 38 to swell in guideway chamber 18 completely sealing the same and preventing any leakage from the flow through passage past the bushing or fixture 28 and in fact anywhere through the valve.

Now it being wished to close the valve the handle is turned in the opposite direction. This releases the compressive force on the plug except to the degree afforded by nut 46, and forces it downwardly through guideway 18 until the lower abutment member 40 finds its seat in the indentation at 22. Obviously the plug cannot go any farther downwardly and therefore continued motion of the handwheel in the appropriate direction causes upper abutment 42 to squeeze the plug between the two abutments 40 and 42 thus swelling the plug 38 once more into intimate sealing contact with respect to the side walls of the guideway 18 in the region 24 thereof, thus completely sealing off all parts of the valve. At all points however the plug is sealed against leakage by nut 46, but can be moved by wheel 44 due to its leverage.

Figure 4:
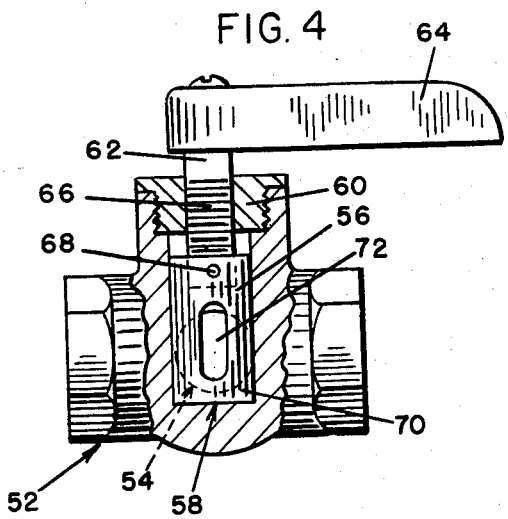
FIG. 4 is a sectional view showing a modification.

Referring now to FIG. 4, the housing is substantially the same as before described and is indicated in general by the reference numeral 52. It has a flow-through opening 54 shown in dotted lines. It also is provided with a cylindrical chamber indicated at 56 and this cylindrical chamber is closed at its bottom end on a flat surface as indicated at 58. The top end of this chamber is open and receives the fitting 60 which is equivalent to that at 28 in FIGS. 1 and 2.

The fitting 60 contains a rod 62 having a handle fixed thereto at 64 and a screw-threaded portion 66 which meshes with internal threads in the fitting 60. At its lower end the rod 62 is fixed by any desired means such as a pin 68 with reference to a plastic cylindrical valve closure member 70 which fits the cylindrical chamber contacting the bottom edge 58 thereof as shown in FIG. 4. The plastic valve member 70 has an opening therethrough at 72.

It will be seen that if the handle is utilized to rotate the valve member 70 90° from the position shown in FIG. 4, the flow-through passage will be cut off but in the position shown in FIG. 4 the valve is open. When the valve is turned to the closed position thereof by turning handle 64 for instance towards the observer, the screw threads at 66 will cause compressive forces to be applied to the plastic member, tending to shorten and widen it by a squeezing action against the surface 58, and therefore at the time when the valve becomes closed it will also become tightly wedged in the chamber 56 so as to provide that this kind of valve is leakproof as well as the valve previously described.

Having thus described my invention and the advantages thereof, I do not wish to be limited to the details herein disclosed, otherwise than as set forth in the claim, but what I claim is:

A leakproof valve comprising a housing, a flow passage therethrough, an elongated guideway chamber extending transversely thereof and through the flow passage, an expansible plug in said chamber, means to move the expansible plug rectilinearly in the guideway chamber, said means comprising a relatively elongated stem having an outer threaded end and an inner end, a first abutment member fixed at the inner end of the stem, the abutment member underlying the plug, a threaded valve actuator member surrounding said stem, said valve actuator member having an outer end and an inner end, a second abutment member slidably mounted on the stem at the inner end of the valve actuator member and overlying the plug and underlying said valve actuator member, a hand wheel fixed to said valve actuator member at the outer end thereof, a screw-threaded fitting on said valve housing threadedly receiving the screw-threaded portion of said valve actuator member, means engaged with the threaded end of the stem to move the stem rectilinearly relative to the valve actuator member in a direction to expand the plug by moving the first abutment member toward the second abutment member, said hand wheel rotating said valve actuator member to move it rectilinearly and thereby to move the plug bodily within the guideway chamber between fully opened and closed conditions of the flow passage, the fitting limiting the motion of the plug in one direction in the chamber, and means in said chamber to limit the plug motion in the other direction, the valve actuator member being adapted to move slightly further than said plug in both directions and thereby further expand the plug between the two abutment members at each point of limit of motion of the plug.

References Cited by the Examiner

UNITED STATES PATENTS

| Re. 25,177 | 5/1962 | Anderson | 251—187 X |
|---|---|---|---|
| 101,002 | 3/1870 | Gilman | 251—192 |
| 720,012 | 2/1903 | Erdman | 251—192 |
| 1,004,845 | 10/1911 | Bohme | 251—190 |
| 1,781,224 | 11/1930 | Gilg | 251—191 |
| 2,213,680 | 9/1940 | Share | 251—190 |
| 2,925,246 | 2/1960 | Sardeson | 251—191 |

FOREIGN PATENTS

| 331,216 | 7/1903 | France. |
|---|---|---|
| 766,314 | 4/1934 | France. |
| 1,147,893 | 6/1957 | France. |
| 759,668 | 10/1956 | Great Britain. |

ISADOR WEIL, *Primary Examiner.*

CLARENCE R. GORDON, *Examiner.*